United States Patent [19]

Miyazaki et al.

[11] Patent Number: 4,931,505

[45] Date of Patent: Jun. 5, 1990

[54] COATING COMPOSITION

[75] Inventors: Nobuyuki Miyazaki; Masao Unoki, both of Yokohama; Seiji Munekata, Tokyo, all of Japan

[73] Assignee: Asahi Glass Company Ltd., Tokyo, Japan

[21] Appl. No.: 252,978

[22] Filed: Oct. 4, 1988

[30] Foreign Application Priority Data

Oct. 5, 1987 [JP] Japan .................................. 62-249950

[51] Int. Cl.$^5$ ........................ C08L 27/12; C08L 61/20
[52] U.S. Cl. .................................... 525/125; 525/108; 525/155; 525/160; 525/193; 525/184; 525/195; 525/200
[58] Field of Search ............... 525/200, 193, 194, 195, 525/108, 125, 155, 160

[56] References Cited

U.S. PATENT DOCUMENTS 4,588,781  5/1986  Ohmori .............................. 525/200

FOREIGN PATENT DOCUMENTS 0121934  10/1984  European Pat. Off. .

Primary Examiner—John C. Bleutge
Assistant Examiner—David Buttner
Attorney, Agent, or Firm—Oblon, Spivak, McClelland, Maier & Neustadt

[57]     ABSTRACT

A coating composition comprising:

(A) a fluorine-containing copolymer having a fluorine content based on fluoroolefin of at least 10% by weight, and (B) a fluorine-containing copolymer of a polyfluorocarbon chain-containing monomer with a hydrophilic group-containing monomer.

20 Claims, No Drawings

COATING COMPOSITION

The present invention relates to a fluoropolymer coating composition having excellent weather resistance.

Heretofore, a coating composition containing, as an essential component, a solvent-soluble fluorine-containing copolymer containing hydroxyl groups has been known as a coating composition capable of providing a coating layer having excellent weather resistance. For example, Japanese Unexamined Patent Publications No. 34107/1982 and No. 136662/1983 disclose a solvent-soluble fluorine-containing copolymer useful as an essential component of a coating composition, and a coating composition containing such a fluorine-containing copolymer.

With conventional weather resistant coating layers, there have been pointed out some problems such that when they are exposed to rain and wind, contaminants in the rain or in muddy water are likely to leave stains in a pattern of spots or streaks on the surface of the coating layers, whereby the outer appearance of the coating layers is impaired. Such stains can not easily be removed by simple washing with water. On the other hand, it is known to eliminate such problem of stains by forming a coating film of a hydrophilic acrylic resin. However, such a coating film has problems that the water resistance and weather resistance are very poor.

It is an object of the present invention to provide a coating composition capable of providing a coating layer having excellent weather resistance and being free from a deterioration of the outer appearance by rain and wind.

The present invention has been made to solve the above-mentioned problems and provides a coating composition comprising:

(A) a fluorine-containing copolymer having a fluorine content based on fluoroolefin of at least 10% by weight, and (B) a fluorine-containing copolymer of a polyfluorocarbon chain-containing monomer with a hydrophilic group-containing monomer.

Now, the present invention will be described in detail with reference to the preferred embodiments.

In the present invention, the fluorine-containing copolymer (A) having a fluorine content based on fluoroolefin of at least 10% by weight, may be a copolymer of a fluoroolefin with a monomer copolymerizable therewith. As the fluorine-containing copolymer (A), it is preferred to employ the one soluble or dispersible in an organic solvent or in water from the viewpoint of coating efficiency. It is preferred to employ a copolymer of a fluoroolefin having 2 or 3 carbon atoms such as tetrafluoroethylene, chlorotrifluoroethylene, trifluoroethylene, vinylidene fluoride, hexafluoropropylene or pentafluoropropylene, with at least one monomer selected from the group consisting of vinyl ethers, vinyl esters, allyl ethers, allyl esters, acrylic acid, acrylic acid esters, methacrylic acid and methacrylic acid esters. If the proportion of the copolymer of fluoroolefin is too small, it is difficult to obtain sufficiently excellent weather resistance as a weather resistant coating material. The proportion of copolymerized fluoroolefin is preferably such that the fluorine content based on fluoroolefin in the copolymer is at least 10% by weight. If the proportion of copolymerized fluoroolefin is too high, the solubility in a solvent or the compatibility with the fluorine-containing copolymer (B) described hereinafter tends to be low, such being undesirable. Preferably, it is a fluorine-containing copolymer wherein a fluoroolefin is copolymerized in a proportion of from 30 to 70 mol %. The fluorine-containing copolymer (A) is preferably copolymerized with the above-mentioned other compound in addition to the fluoroolefin from the viewpoint of e.g. the solubility to a solvent. Particularly, vinyl ethers, vinyl esters, allyl ethers and allyl esters are preferred since they have excellent copolymerizability. Particularly preferred are alkyl vinyl ethers, alkyl vinyl esters, alkylallyl ethers and alkylallyl esters having straight, branched or alicyclic alkyl groups having from 1 to 10 carbon atoms.

The fluorine-containing copolymer (A) preferably has curable reactive sites in addition to the above-mentioned copolymer components, to obtain a stronger coating layer. Such curable reactive sites include active hydrogen-containing groups such as hydroxyl groups, amino groups, acid amido groups or carboxylic acid groups, epoxy groups, halogens, double bonds and hydrolyzable silyl groups capable of reacting with an isocyanate curing agent or with an aminoplast curing agent. Such curable reactive sites can be introduced by a method of copolymerizing a monomer having a curable reactive site, such as a hydroxyalkyl vinyl ether, a hydroxyalkyl allyl ether, aglycidyl vinyl ether or acrylic acid, or a method of modifying the copolymer. For example, a carboxylic acid group can be introduced by reacting a polycarboxylic acid anhydride to a hydroxyl group or to an epoxy group. Likewise, a double bond can be introduced by reacting e.g. an isocyanate alkyl acrylate thereto. The copolymer units having curable reactive sites are preferably from 5 to 20 mol % in the copolymer. Particularly preferred is the one wherein the proportion of the monomer having a curable reactive site is from 5 to 20 mol % based on the entire monomers.

It is important that the composition of the present invention contains a fluorine-containing copolymer (B) of a polyfluorocarbon chain-containing monomer with a hydrophilic group-containing monomer. Here, the polyfluorocarbon chain-containing monomer may usually be a monomer having a polyfluoroalkyl group, preferably a perfluoroalkyl group, having from 2 to 18 carbon atoms, preferably from 2 to 10 carbon atoms. For example, unsaturated esters such as the following acrylates and methacrylates may be mentioned.

$CF_3(CF_2)_4CH_2OCOC(CH_3)=CH_2$,
$CF_3(CF_2)_6(CH_2)_2OCOC(CH_3)=CH_2$,
$CF_3(CF_2)_6(CH_2)_2OCOCH=CH_2$,
$CF_3(CF_2)_7CH_2CH_2OCOCH=CH_2$,

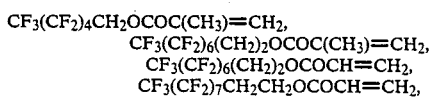

$CF_3(CF_2)_7SO_2N(C_3H_7)(CH_2)_2OCOCH=CH_2$,
$CF_3(CF_2)_7(CH_2)_4OCOCH=CH_2$,
$CF_3(CF_2)_7SO_2N(CH_3)(CH_2)_2OCOC(CH_3)=CH_2$,
$CF_3(CF_2)_7SO_2N(C_2H_5)(CH_2)_2OCOCH=CH_2$,
$CF_3(CF_2)_7CONH(CH_2)_2OCOCH=CH_2$,

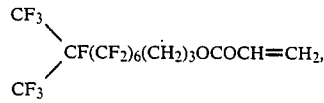

-continued

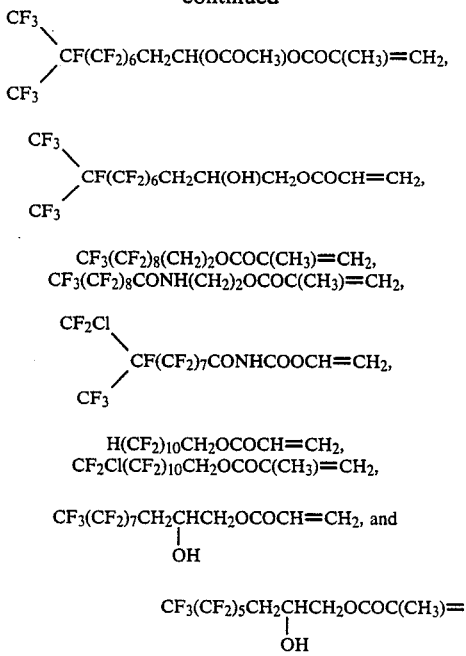

$CF_3(CF_2)_8(CH_2)_2OCOC(CH_3)=CH_2,$
$CF_3(CF_2)_8CONH(CH_2)_2OCOC(CH_3)=CH_2,$ $H(CF_2)_{10}CH_2OCOCH=CH_2,$
$CF_2Cl(CF_2)_{10}CH_2OCOC(CH_3)=CH_2,$ $CF_3(CF_2)_7CH_2\underset{\underset{OH}{|}}{C}HCH_2OCOCH=CH_2,$ and $CF_3(CF_2)_5CH_2\underset{\underset{OH}{|}}{C}HCH_2OCOC(CH_3)=CH.$ In the present invention, as the polyfluorocarbon chain-containing monomer, a vinyl ether having a polyfluoroalkyl group, preferably a perfluoroalkyl group, having from 2 to 18 carbon atoms, preferably from 2 to 10 carbon atoms, can also be used. For example, the following polyfluoroalkyl group-containing alkyl vinyl ethers may be mentioned:

$CF_3(CF_2)_5CH_2CH_2OCH_2CH_2OCH=CH_2,$

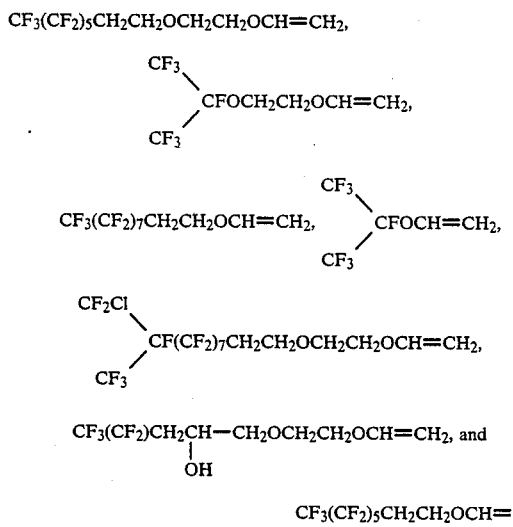

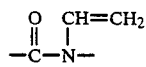

It is of course possible to employ as the polyfluorocarbon chain-containing monomer, a monomer having also a functional group to provide a curable reactive site, such as $CF_3(CF_2)_7CH_2\underset{\underset{OH}{|}}{C}HCH_2OCOCH=CH_2$ or

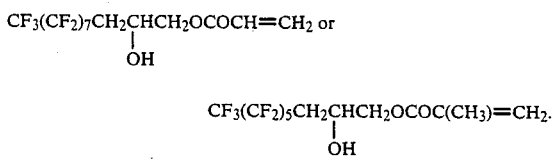

In the present invention, the hydrophilic group-containing monomer may be an acrylic, methacrylic, vinyl or allyl compound which has a hydrophilic group such as an amido group, a polyethylene glycol chain, a polyhydric alcohol fatty acid chain (partial) ester structure, a sulfonate group, a sulfuric acid ester group, a phosphoric acid ester group, a carboxylate group, a quaternary ammonium salt group or an amine salt group. Particularly preferred is an acrylic, methacrylic or vinyl compound from the viewpoint of the copolymerizability with the polyflurocarbon chain-containing monomer. As the hydrophilic group, an amido group or a polyethylene glycol chain is preferably employed, since it scarcely adversely affect the coating layer. Specifically, a polyethylene glycol chain-containing compound such as polyethylene glycol methacrylate, polyethylene glycol acrylate, methoxypolyethylene glycol methacrylate or methoxypolyethylene glycol acrylate, or an amide group-containing compound such as acrylamide, methacrylamide or N-vinyl-lactam compound, may be mentioned. Here, the polyethylene glycol chain is preferably the one containing from 3 to 20 repeating units of the formula $-CH_2CH_2O-$. The N-vinyl-lactam compound is an organic cyclic compound containing an atomic group of the formula $$-\underset{\underset{}{}}{\overset{O}{\overset{\|}{C}}}-\underset{\underset{}{}}{N}-\overset{CH=CH_2}{|}$$

in the ring. Specifically, it includes N-vinyl-β-propiolactam, N-vinyl-2-pyrrolidone, N-vinyl-γ-valerolactam, N-vinyl-2-piperidone, N-vinyl-ε-caprolactam and N-vinyl-heptolactam. However, the one having a large ring is not preferred, since the hydrophilic nature will be poor. Preferably, an N-vinyl-lactam compound having a not more than 7-membered ring is preferred. N-vinyl-2-pyrrolidone is preferably used particularly because it is excellent in the stability.

With respect to the proportions for copolymerization of the polyfluorcarbon chain-containing monomer and the hydrophilic group-containing monomer, it is preferred that the polyfluorocarbon chain-containing monomer is copolymerized in a proportion of from 1 to 30% by weight, preferably from 3 to 10% by weight, and the hydrophilic group-containing monomer is copolymerized in a proportion of at least 50% by weight. If the proportion of the polyfluorocarbon chain-containing monomer is less than 1% by weight, no adequate effect to concentrate the hydrophilic groups to the vicinity of the surface of the coating layer will be obtained, and to achieve the object of the present invention, the specific fluorine-containing copolymer (B) will be required in a large amount, such being undesirable. Further, if the specific fluorine-containing copolymer (B) is used in a large amount, a large number of hydrophilic groups will be present in the coating layer, whereby the water resistance of the coating layer tends to deteriorate. On the other hand, if the proportion of the polyfluorocarbon chain-containing monomer exceeds 30% by weight, the hydrophilic nature of the specific fluorine-containing copolymer (B) tends to be low, whereby the object of the present invention can not be accomplished. Likewise, if the proportion of the hydrophilic group-containing monomer is too small, the object of the present invention can not be attained.

Further, the fluorine-containing copolymer (B) preferably has curable reactive sites, whereby the effects can be maintained for a long period of time. Such curable reactive sites may be groups reactive with the curable reactive sites of the fluorine-containing copolymer (A) or groups reactive with a curing agent. Specifically, they may be the same groups as mentioned with respect to the curable reactive sites of the fluorine-containing copolymer (A), such as hydroxyl groups, carboxylic acid groups, amino groups, epoxy groups or acid amide groups. Such curable reactive sites can be introduced by copolymerizing a monomer having a curable reactive site such as 2-hydroxyethyl acrylate, glycidyl methacrylate or methacrylic acid, to the above polyfluorocarbon chain-containing monomer and the hydrophilic group-containing monomer. When a monomer having a curable reactive site such as a hydroxyl group is employed as the hydrophilic group-containing monomer or as the polyfluorocarbon chain-containing monomer, no additional monomer having a curable reactive site may be copolymerized.

In the present invention, it is preferred to blend a certain specific amount of the fluorine-containing copolymer (B) to the flourine-containing copolymer (A). Namely, the fluorine-containing copolymer (B) is used in an amount of from 1 to 50 parts by weight, preferably from 5 to 20 parts by weight, per 100 parts by weight of the fluorine-containing copolymer (A). If the amount of the polyfluoroalkyl group-containing polymer is too small, no adequate effect for the improvement of the surface properties of the coating layer such as stainproof properties or stain-removal properties will be obtained. On the other hand, if the amount is too much, the physical properties of the coating film such as the surface hardness, solvent resistance and impact resistance tend to be impaired, or a deterioration of the weather resistance or water resistance of the coating layer is likely to be brought about.

Various solvents may be used for the preparation of the composition of the present invention. Aromatic hydrocarbons such as xylene and toluene, alcohols such as n-butanol, esters such as butyl acetate, ketones such as methyl isobutyl ketone, glycol ethers such as ethyl cellosolve and commercially available various thinners may be used. The mixing with such a solvent can be conducted by means of various machines which are commonly employed for the preparation of coating materials, such as a ball mill, a paint shaker, a jet mill, a three-roll mill or a kneader. At that time, a pigment, a dispersion stabilizer, a viscosity controlling agent, a leveling agent, an antigelation agent or an ultraviolet absorber may be incorporated.

The composition of the present invention is capable of forming a cured coating layer having excellent physical properties by co-crosslinking the fluorine-containing copolymers (A) and (B) by various curing agents. As such curing agents, various types may be used depending upon the curable reactive sites of the two types of the fluorine-containing copolymers. The curing agents include, for example, an aminoplast, a polyvalent isocyanate compound, a polybasic acid compound, a polyvalent amine compound, a polyallyl compound and a metal alkoxide. For example, when the curable reactive sites of the fluorine-containing copolymers (A) and (B) are active hydrogen-containing groups, an aminoplast, a polyvalent isocyanate compound, a polybasic acid compound or its anhydride, which is commonly used for a usual acrylic coating material, may be used as the curing agent. As the aminoplast, a melamine resin, a guanamine resin or a urea resin may be used. The melamine resin may be butylaeed melamine, methylated melamine or an epoxy-modified melamine. Further, a melamine resin etherified by a lower alcohol such as methanol, ethanol, propanol or butanol may also be used. The urea resin may be a methylated urea resin or an ethylated urea resin. The polyvalent isocyanate compound may be a non-yellowing isocyante such as hexamethylene diisocyanate or isophorone diisocyanate, or a blocked compound or oligomers thereof. The polybasic acid compound may be a long chain aliphatic dicarboxylic acid, an aromatic polycarboxylic acid or an anhydride thereof When an aminoplast, a blocked polyvalent isocyanate compound or a polybasic acid compound is used as the curing agent, the fluorine-containing copolymers (A) and (B) can be co-crosslinked under heating. When a non-blocked polyvalent isocyanate compound is used, the co-crosslinking can be conducted at room temperature. When an aminoplast is used as the curing agent, the co-crosslinking can be facilitated by an addition of an acid catalyst. When a polyvalent isocyanate compound is used as the curing agent, the co-crosslinking can be facilitated by an addition of a known catalyst such as dibutyltin dilaurate.

Further, for the purpose of improving the distinctiveness, mechanical strength, adhesion, durability or the like, it is possible to optionally incorporate additives such as a pigment, a coloring agent, a filler or a stabilizer to the composition of the present invention. Typical examples of such additives include Phthalocyanine Green, titanium oxide, alumina, talc, calcium carbonate and silica.

The composition of the present invention may be applied not only to a metal such as iron, aluminum, copper or an alloy thereof (e.g. stainless steel or brass) but also an inorganic material such as glass, cement or concrete and an organic material such as plastics including fiber reinforced plastics, polyethylene, polypropylene, an ethylene-vinyl acetate copolymer, a polyamide, a polyacrylic resin, a polyester, an ethylene-polyvinyl alcohol copolymer, polyvinyl chloride, polyvinylidene chloride, polycarbonate and polyurethane, rubber, wood and fiber, as well as various substrates having coating layers. Further, the shape of the substrate is not restricted to a flat plate, and the 5 coating layer may readily be formed also on a substrate having a complicated shape. Further, the coating may be carried out at site and may be applied to a large structural object such as interior walls of a tunnel.

Optional additions or modifications may of course be possible without departing from the object and spirit of the present invention. For example, the substrate to which the composition of the present invention is to be applied, may be optionally subjected to pretreatment or surface treatment. Otherwise, a suitable undercoating or precoating may be applied prior to the application of the composition of the present invention. Further, the composition of the present invention may be formulated in a two pack form, or it may be combined with a curing agent solution in the form of two pack form.

It is considered that in the present invention, the polyfluorocarbon chain of the fluorine-containing copolymer (B) has a low surface energy and thus transfers to the side of interface with air during the formation of the coating layer, whereby the copolymerized hydrophilic groups are concentrated in the vicinity of the surface.

It is considered that when the coating layer is in a dried state, it presents a water repellent surface by virtue of the polyfluorocarbon chain, but when exposed with a large amount of water, the polyfluorocarbon chain withdraws from the surface and the hydrophilic groups transfer to the surface, whereby the surface becomes hydrophilic.

The fluorine-containing copolymer (B) is concentrated in the vicinity of the surface, and in a dried state, the surface of the coating layer has water repellency. Therefore, as the coating layer as a whole, it maintains the high water resistance and high weather resistance of the fluoropolymer coating layer, and at the same time it is capable of forming a hydrophilic surface, whereby stains in the pattern of spots or streaks which used to be observed with the conventional weather resistant heat curable coating layers, scarcely form.

Now, the present invention will be described in detail with reference to Examples and Comparative Examples. However, it should be understood that the present invention is by no means restricted by such specific Examples.

EXAMPLES 1 to 8 and COMPARATIVE EXAMPLES 1 to 5

Fluorine-containing copolymers A-1 to A-4 were prepared by polymerizing monomer mixtures having the compositions as identified in Table 1 in a solvent mixture of t-butanol and sec-butanol at 65° C. by using azobisisobutylonitrile as the initiator.

TABLE 1

| | (mol %) | | | |
|---|---|---|---|---|
| | A-1 | A-2 | A-3 | A-4 |
| Tetrafluoroethylene | 50 | — | — | — |
| Chlorotrifluoroethylene | — | 50 | 50 | 50 |
| Cyclohexyl vinyl ether | 25 | 10 | 10 | 10 |
| Ethyl vinyl ether | 15 | 30 | 20 | — |
| Hydroxybutyl vinyl ether | 10 | 10 | 20 | 10 |
| Veova 9 | — | — | — | 20 |

In Table 1, Veova 9 is a tradename for a vinyl ester of a saturated carboxylic acid having 9 carbon atoms and a branched structure (manufactured by Shell Chemical Company).

Fluorine-containing copolymers B-1 to B-6 were prepared by polymerizing monomer mixtures having the positions as identified in Table 2 in ethyl acetate at 60° C. by using azobisisobutylonitrile as the initiator.

TABLE 2

| | (mol %) | | | | | | | |
|---|---|---|---|---|---|---|---|---|
| | B-1 | B-2 | B-3 | B-4 | B-5 | B-6 | B-7 | B-8 |
| FMA | 5 | 5 | 5 | — | — | 5 | 10 | 5 |
| M-40G | 70 | — | — | 75 | — | — | — | — |
| PE-200 | — | 70 | — | — | — | — | — | — |
| NVP | — | — | 70 | — | 75 | — | — | — |
| AAm | — | — | — | — | — | — | 45 | — |
| BMAAm | — | — | — | — | — | — | — | 70 |
| HEMA | 20 | 20 | 20 | 20 | 20 | 20 | 20 | 20 |
| MAA | 5 | 5 | 5 | 5 | 5 | 5 | 5 | 5 |
| n-BMA | — | — | — | — | — | 70 | 20 | — |

In Table 2, FMA is $CH_2=CCH_3COO-C_2H_4-(CF_2)_n-F$ (a mixture of n=4–10).

M-40G is $CH_2=CCH_3COO-(CH_2CH_2O)_m-CH_3$ (m=4).

PE-200 is $CH_2=CCH_3COO+CH_2CH_2O+_l H$ (a mixture of l=4–5).

NVP is

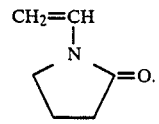

AAm is $CH_2=CHCONH_2$.
BMAAm is $CH_2=CHCONH-CH_2OC_4H_9$.
HEMA is 2-hydroxyethyl methacrylate.
MAA is methacrylic acid.
n-BMA is n-butyl methacrylate.

By using fluorine-containing copolymers A-1 to A-4 and B-1 to B-8, compositions having the blend proportions (parts by weight) as identified in Table 3 were prepared.

Then, each of such compositions were coated on an aluminum plate to which arozine treatment was preliminarily applied and dried at 140° C. for 30 minutes to obtain a coating layer. Such coating layer was subjected to a staining test, a weathering test and an accelerated weather resistance test. The results are shown in Table 4.

TABLE 3

| | Examples | | | | | | | | Comparative Examples | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Fluorine-containing Copolymer A (100 phr) | A-1 | A-2 | A-2 | A-2 | A-3 | A-4 | A-2 | A-2 | A-2 | A-4 | A-4 | A-4 | A-4 |
| Fluorine-containing Copolymer B (10 phr) | B-1 | B-1 | B-2 | B-3 | B-3 | B-3 | B-7 | B-8 | — | — | B-4 | B-5 | B-6 |
| Xylene | 100 | 100 | 100 | 100 | 100 | 100 | 100 | 100 | 100 | 100 | 100 | 100 | 100 |
| Methanol | 10 | 10 | 10 | 10 | 10 | 10 | 10 | 10 | 10 | 10 | 10 | 10 | 10 |
| Curing agent | 16 | 16 | 16 | 16 | 16 | 16 | 16 | 16 | 16 | 16 | 16 | 16 | 16 |
| TiO$_2$ | 40 | 40 | 40 | 40 | 40 | 40 | 40 | 40 | 40 | 40 | 40 | 40 | 40 |

In Table 3, the curing agent is a melamine type curing agent (Cymel 325, tradename, manufactured by Mitsui Toatsu Chemicals, Inc.)

TABLE 4

| | | Examples | | | | | | | | Comparative Examples | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Contact angle (deg) | Water | 91 | 92 | 95 | 94 | 95 | 92 | 90 | 88 | 83 | 80 | 82 | 80 | 105 |
| | n-Decane | 38 | 36 | 40 | 41 | 40 | 38 | 38 | 35 | <5 | <5 | <5 | <5 | 40 |
| | n-Octane | 85 | 95 | 92 | 101 | 100 | 98 | 98 | 90 | 54 | 55 | 55 | 55 | 52 |

TABLE 4-continued

| | | Examples | | | | | | | | Comparative Examples | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Staining test | (in water) Stain deposition | O | O | O | O | O | O | O | O | Δ | Δ | Δ | Δ | X |
| | Wiping off efficiency | O | O | ⊙ | ⊙ | ⊙ | O | O | O | Δ | Δ | X | Δ | O |
| Weathering test | | No stain | No stain | No stain | No stain | No Stain | No stain | No stain | No stain | Stained | Stained | Stained | Stained | Stained |
| Weather resistance test | | 92 | 89 | 90 | 88 | 88 | 91 | 86 | 87 | 90 | 85 | 89 | 88 | 81 |

EXAMPLE 9

The operation was conducted in the same manner as in Example 1 except that the curing agent was changed to 33 parts by weight of a blocked isocyanate curing agent (C2507, tradename, manufactured by Nippon Polyurethane Company). The coating layer thereby obtained was subjected to the tests for contact angles in water, n-decane and n-octane (in water), a staining test, a weathering test and an accelerated weather resistance test. The results were substantially the same as Example 1.

EXAMPLE 10

The operation was conducted in the same manner as in Example 1, except that the curing agent was changed to 25 parts by weight of a polyvalent isocyanate curing agent (Colonate EH, tradename, manufactured by Nippon Polyurethane Company) and the drying was conducted at room temperature for 7 days. The coating layer thereby obtained was subjected to a test for contact angles in water, n-decane and n-octane (in water), a staining test, a weathering test and an accelerated weather resistance test. The test results were substantially the same as in Example 1.

The staining test, the weathering test and the accelerated weather resistance test were conducted in the following manners.

Staining Test

The stain deposition was determined in such a manner that a 0.1 wt % carbon black dispersion in distilled water was sprayed on a coating layer, followed by drying at 90° C. in a drier for 10 minutes, and this cycle was repeated 6 times, whereupon the staining state by carbon was evaluated by the following standards:
⊙ The stain spreads over the entire surface.
O The stain slightly takes a pattern of spots.
Δ: The stain takes a pattern of spots.
X: The stain distinctly takes a pattern of spots.

The washing off efficiency was determined in such a manner that after the above stain deposition test, the stained coating surface was wiped with water, whereupon the coating layer surface was evaluated by the following standards:
⊙ No stain remains.
O: No substantial stain remains.
Δ: Stain remains.
X: Stain distinctly remains

Weathering Test

After the weathering exposure, the presence or absence of the stain left after the streaks of rain water was examined.

Accelerated Weather Resistance Test

The gloss retention rate (%) after 3,000 hours in the sunshine weatherometer, was measured.

The composition of the present invention is capable of forming a coating layer whereby a distinct stain in the pattern of spots or streaks which used to be a problem with the conventional weather resistant coating materials does not form and a stain can easily be removed, without impairing the weather resistance of a weather resistant coating material. Further, it is excellent also in the water and oil repellency and is very useful as a maintenance free and wax free weather resistant coating material.

What is claimed:

1. A coating composition comprising:
   (A) a fluorine-containing copolymer having a fluorine content based on fluoroolefin of at least 10% by weight, and
   (B) a fluorine-containing copolymer of a polyfluorocarbon chain-containing monomer with a hydrophilic group-containing monomer wherein said hydrophilic group is a member selected from the group consisting of a polyethylene glycol, a polyhydric alcohol fatty acid partial ester, a sulfonate, a sulfuric acid ester, a phosphoric acid ester, a quaternary ammonium salt, an amine salt and N-vinyl lactam.

2. The coating composition according to claim 1, wherein the fluorine-containing copolymer (A) is a copolymer soluble or dispersible in an organic solvent or in water.

3. The coating composition according to claim 1, wherein the fluorine-containing copolymer (A) is a copolymer obtained by copolymerizing from 30 to 70 mol % of a fluoroolefin and from 30 to 70 mol % of other monomer.

4. The coating composition according to claim 3, wherein said other monomer is at least one monomer selected from the group consisting of vinyl ethers, vinyl esters, allyl ethers and allyl esters.

5. The coating composition according to claim 1, wherein the fluorine-containing polymer (A), in addition to its other components, has curable reactive sites selected from the group consisting of active hydrogen-containing groups, epoxy groups, double bonds and hydrolyzable silyl groups.

6. The coating composition according to claim 5, wherein the curable reactive sites are active hydrogen-containing groups.

7. The coating composition according to claim 5, wherein the fluorine-containing copolymer (A) having curable reactive sites is a copolymer of at least one fluoroolefin, at least one monomer having a curable reactive site and at least one monomer having no curable reactive site.

8. The coating composition according to claim 7, wherein the curable reactive sites are active hydrogen-containing groups.

9. The coating composition according to claim 7, wherein the proportion of the monomer having a curable reactive site is from 5 to 20 mol % based on the entire monomers.

10. The coating composition according to claim 1, wherein the polyfluorocarbon chain-containing monomer is a monomer containing a polyfluoroalkyl group having from 2 to 18 carbon atoms.

11. The coating composition according to claim 1, wherein the polyfluorocarbon chain-containing monomer is at least one compound selected from the group consisting of acrylic, methacrylic and vinyl compounds containing a polyfluoroalkyl group having from 2 to 18 carbon atoms.

12. The coating composition according to claim 1, wherein the hydrophilic group-containing monomer is a monomer containing a polyethylene glycol chain.

13. The coating composition according to claim 12, wherein the hydrophilic group-containing monomer is a compound selected from the group consisting of acrylic compounds, methacrylic compounds and vinyl compounds.

14. The coating composition according to claim 1, wherein the fluorine-containing copolymer (B) is a copolymer obtained by copolymerizing from 1 to 30% by weight of the polyfluorocarbon chain-containing monomer and at least 50% by weight of the hydrophilic group-containing monomer.

15. The composition according to claim 1, wherein the fluorine-containing copolymer (B), in addition to its other components, has curable reactive sites selected from the group consisting of active hydrogen containing groups, eopxy groups, double bonds and hydrolyzale silyl groups.

16. The coating composition according to claim 15 wherein the curable reactive sites are active hydrogen-containing groups.

17. The coating composition according to claim 15, wherein the fluorine-containing copolymer (B) comprises at least one polyfluorocarbon chain-containing monomer, at least one of said hydrophilic group containing monomers, at least one of said curable reactive site containing monomers and at least one additional copolymerizable monomer different from the aforementioned monomers.

18. The coating composition according to claim 1, which comprises 100 parts by weight of the fluorine-containing copolymer (A) and from 1 to 50 parts by weight of the fluorine-containing copolymer (B).

19. The coating composition according to claim 1, wherein both the fluorine-containing copolymer (A) and (B), in addition to their other components, have curable reactive sites selected from the group consisting of active hydrogen containing groups, epoxy groups, double bonds and hydrolyzable silyl groups and a curing.

20. The coating composition according to claim 19 wherein the curable reactive sites of the fluorine-containing copolymers (A) and (B) are active hydrogen-containing groups, and the curing agent is a compound selected from the group consisting of aminoplasts and polyvalent isocyanates.

* * * * *